(12) United States Patent
Bozsik et al.

(10) Patent No.: US 10,407,042 B2
(45) Date of Patent: Sep. 10, 2019

(54) PREDICTION OF REMAINING LIFETIME FOR COMPRESSED AIR SUPPLY SYSTEM COMPONENT

(71) Applicant: KNORR-BREMSE Systeme fuer Nutzfahrzeuge GmbH, Munich (DE)

(72) Inventors: Richard Bozsik, Budapest (HU); Csongor Doeme, Pecs (HU); Levente Balogh, Kecskemét (HU)

(73) Assignee: KNORR-BREMSE Systeme fuer Nutzfahrzeuge GmbH, Munich (DE)

(*) Notice: Subject to any disclaimer, the term of this patent is extended or adjusted under 35 U.S.C. 154(b) by 0 days.

(21) Appl. No.: 15/574,866

(22) PCT Filed: May 18, 2016

(86) PCT No.: PCT/EP2016/000825
§ 371 (c)(1),
(2) Date: Nov. 17, 2017

(87) PCT Pub. No.: WO2016/184568
PCT Pub. Date: Nov. 24, 2016

(65) Prior Publication Data
US 2018/0126972 A1    May 10, 2018

(30) Foreign Application Priority Data
May 19, 2015   (EP) ..................... 15168056

(51) Int. Cl.
*B60T 17/22*    (2006.01)
*B60T 17/00*    (2006.01)
(Continued)

(52) U.S. Cl.
CPC .......... *B60T 17/004* (2013.01); *B60T 13/683* (2013.01); *B60T 17/22* (2013.01); *F15B 19/005* (2013.01);
(Continued)

(58) Field of Classification Search
CPC ........ B60T 17/004; B60T 17/18; B60T 17/22; B60T 2270/406; F04B 49/10; F15B 19/005; F15B 19/007; F15B 21/048
(Continued)

(56) References Cited

U.S. PATENT DOCUMENTS 6,799,951 B2 * 10/2004 Lifson ..................... F04B 49/10
                                                              417/53
9,310,439 B2 *  4/2016 Pham .................. G01R 31/343
(Continued)

FOREIGN PATENT DOCUMENTS

CN            1446158        10/2003
CN          102200076         9/2011
(Continued)

OTHER PUBLICATIONS

Extended European Search Report issued in counterpart European Application No. 15168056.8 dated Nov. 9, 2015 (5 pages).
(Continued)

*Primary Examiner* — Thomas J Williams
(74) *Attorney, Agent, or Firm* — Crowell & Moring LLP

(57) ABSTRACT

A device is provided for predicting the remaining lifetime of a component in a compressed air supply system for a vehicle. This device includes a memory unit for a value related to the degradation of the component, at least one first input for a usage quantity which is a measure for the operating time and/or number of operating cycles of the component and/or for the amount of compressed air delivered by the compressed air supply system, at least one second input for at least one state variable which is a measure for at least one vehicle and/or air supply operation condition or environmental condition. It also includes an evaluation unit that is configured to combine the usage quantity and the state variable into a lifetime decrement
(Continued)

value that is a measure for the degradation of the component caused by the usage according to the usage quantity, and update the value in the memory unit according to this lifetime decrement value.

17 Claims, 2 Drawing Sheets

(51) Int. Cl.
   *F15B 19/00* (2006.01)
   *B60T 13/68* (2006.01)
   *F15B 21/048* (2019.01)
   *F16D 66/00* (2006.01)

(52) U.S. Cl.
   CPC ....... *F15B 21/048* (2013.01); *B60T 2270/406* (2013.01); *F16D 2066/001* (2013.01)

(58) Field of Classification Search
   USPC .................. 701/99, 100, 29.1, 29.4, 31.9
   See application file for complete search history.

(56) References Cited

U.S. PATENT DOCUMENTS

| 10,233,920 | B2* | 3/2019 | Worden | F04B 49/065 |
| 2003/0102191 | A1 | 6/2003 | DeVlieg | |
| 2014/0095015 | A1* | 4/2014 | Nieten | G07C 3/00 701/31.9 |
| 2014/0188329 | A1* | 7/2014 | Chen | G07C 5/008 701/29.6 |
| 2017/0356346 | A1* | 12/2017 | Jiang | F02C 7/30 |
| 2018/0073389 | A1* | 3/2018 | Zhang | B01D 46/008 |

FOREIGN PATENT DOCUMENTS

| CN | 102220979 | 10/2011 |
| CN | 104364523 | 2/2015 |
| DE | 10 2004 026 624 B3 | 6/2005 |
| JP | 2005-171940 A | 6/2005 |
| KR | 10-1283644 B1 | 7/2013 |
| WO | WO 02/12043 A1 | 2/2002 |

OTHER PUBLICATIONS

International Search Report (PCT/ISA/210) issued in PCT Application No. PCT/EP2016/000825 dated Sep. 29, 2016 (5 pages).
Written Opinion (PCT/ISA/237) issued in PCT Application No. PCT/EP2016/000825 dated Sep. 29, 2016 (5 pages).
Chinese Office Action dated May 27, 2019 with English translation (8 pages).

\* cited by examiner

PREDICTION OF REMAINING LIFETIME FOR COMPRESSED AIR SUPPLY SYSTEM COMPONENT

FIELD OF THE INVENTION

The invention relates to a device for predicting the remaining lifetime of a component in a compressed air supply system for a vehicle, preferably for a commercial vehicle.

BACKGROUND OF THE INVENTION

In a compressed air supply system for a commercial vehicle, some components are specified to be maintenance-free for the lifetime of the vehicle, while other components have to be serviced at regular intervals that may be measured in time or in mileage. Those specifications are usually only valid for a certain range of usage scenarios. Usually, large safety margins are built into the specifications, so that a departure from the envisaged usage scenarios is unlikely to cause a premature breakdown of the component.

Due to the large safety margins, components are serviced more often than is really necessary. Their service life is not used up efficiently. On the other hand, reducing the safety margins will entail the danger that a component will fail prematurely during particularly heavy use. In this case, the vehicle will not be able to limp home, as many of its vital systems require compressed air to run.

The document KR 10 128 36 44 B1 discloses a method to predict wear of a ship engine by monitoring bearing abrasion. In components for compressed air systems, such a direct observation of wear during normal operation is usually not possible.

The document JP 2005 171 940 A discloses an engine maintenance time prediction device that weights time intervals with the average engine load during those time intervals. Since the wear of compressed air system components usually depends on several variables, such a weighting will not be accurate enough to reliably predict when components are due for maintenance.

OBJECT OF THE INVENTION

It is therefore the object of the present invention to provide a more reliable prediction for the remaining lifetime of a component in a compressed air supply system.

This object is solved by the device and a calibration method according to embodiments of the invention.

DISCLOSURE OF THE INVENTION

The invention provides a device for predicting the remaining lifetime of a component in a compressed air supply system for a vehicle. This vehicle is preferably a road vehicle, for example, a commercial vehicle.

The device contains a memory unit for a value related to the degradation of the component. It has at least one first input for a usage quantity which is a measure for the operating time and/or number of operating cycles of the component and/or for the amount of compressed air delivered by the compressed air supply system. The operating cycles may, for example, be power-on/power-off cycles of the component, or turns of a rotating component. They may, for example, be turns of a compressor. The device also has at least one second input for at least one state variable which is a measure for at least one vehicle and/or air supply operation condition or environmental condition.

The device further comprises an evaluation unit that is configured to combine the usage quantity and the state variable into a lifetime decrement value that is a measure for the degradation of the component caused by the usage according to the usage quantity. It is configured to update the value in the memory unit according to this lifetime decrement value.

In a specially advantageous embodiment of the invention, the evaluation unit is configured to determine the lifetime decrement value by estimating a derivative of the degradation of the component with respect to the usage quantity from the state variable and integrating this derivative over the usage quantity. The derivative may be a first-order or a higher-order derivative. The integration over the usage quantity may, for example, be an integration of the derivative expressed as a function of the usage quantity, within the limits from zero to the value of the usage quantity. For example, if a motor or a compressor is overloaded, the degradation caused by this overloading may increase non-linearly with the time interval over which this overloading persists.

In a further specially advantageous embodiment of the invention, the evaluation unit is configured to determine a degradation rate of the component per unit of the usage quantity from the state variable and to determine the lifetime decrement value from this degradation rate and the usage quantity. This allows for a simplified calculation especially in cases where the degradation caused by an amount of usage depends linearly on this amount of usage, with the proportionality constant being determined by the state variable.

The component can preferably be at least one of a compressor, a part of a compressor, an air dryer, an oil separator, a particle filter, a moisture container, a valve, preferably a valve configured to vent a passage between said compressor and said air dryer, and/or a silencer disposed in said vent of the passage between the compressor and the air dryer.

Preferably, the state variable may be at least one of the ambient temperature, the ambient moisture, the moisture of the delivered air, the running speed of the compressor, the temperature of the compressor, the degree of the saturation of the air dryer, an amount or concentration of moisture in a moisture container of the air dryer, the duty cycle of the compressor and/or the system pressure of the compressed air system.

The inventors have realized that while the degradation of the component cannot be easily monitored directly during normal operation of the vehicle, the lifetime decrement value, the degradation rate per unit time, per operating cycle and/or per unit amount of compressed air, and/or the derivative of the degradation are linked to state variables that are readily available while the vehicle is running. The calibration between the state variables and the lifetime decrement value, the degradation rate and/or the derivative of the degradation can be determined off-line, i.e. outside of the normal operation of the vehicle. It can, for example, be determined during a vehicle test or by testing the components on a test bench. Those tests may comprise normal operation as well as peak loads, extreme environmental temperatures, higher than peak system pressures, higher than peak engine speeds, extremely long on-load phases of the compressor, past-due maintenance of the compressor oil, past-due maintenance of the air cleaner, operation of the compressor at speeds where it is most prone to rattling, and other extreme operating conditions that are usually avoided during normal operation of the vehicle. The calibration between the state variables and the lifetime decrement value, the degradation rate and/or the derivative of the degradation can then be stored inside the evaluation unit for use during normal operation of the vehicle.

The value related to the degradation of the component that is stored in the memory unit yields a prediction for the remaining lifetime of the component. Basically, it can be regarded as the balance of an account from which the operation of the vehicle makes withdrawals. Every use of the component must be paid for, with the price depending on how harsh the operating conditions are on the component. This price is debited from the lifetime account in the form of a degradation. For example, a given quantity of compressed air may cost half its average price if the compressor is operated under very favorable conditions, but five times its average price if the compressor is operated in very harsh conditions. The "currency" of the account may, for example, be the percentage of the remaining service life of the component, relative to a fresh component. A fresh component starts out with a balance of 100%. When the balance reaches 0%, the component must be serviced or replaced. The remaining balance in percent may be easily converted to a remaining time or remaining mileage until maintenance by dividing it with the average consumption per unit time or per unit mileage. This information may be provided continuously through on-board communication to electronic control units and/or to a dashboard display. It may also be downloaded from the vehicle by means of its diagnostic port. It may also be broadcasted through an on-board fleet management system to the stationary origin location for the fleet management so that arrangements can be made for the time while the vehicle is being serviced. If the balance reaches zero, which means that the predicted time or mileage for maintenance has come, immediate warning indication may be provided to the vehicle operator.

Both the usage quantity and the state variable may be measured directly, in the form of physical properties, or indirectly, e.g., through an estimation based on environmental and/or vehicle conditions. To this end, the temperature, air flow speed and/or air pressure may be measured at any point in the compressed air supply system. Alternatively or in combination, quantities that are related to the water content and/or the oil content of the air may be measured at any point in the compressed air supply system. In a specially advantageous embodiment of the invention, the evaluation unit may contain a look-up table which relates parametrized ranges of one or more state variables to the lifetime decrement value, the degradation rate and/or the derivative of the degradation of the component. The evaluation unit may also contain a characteristic diagram that relates one or more state variables to the lifetime decrement value, the degradation rate and/or the derivative of the degradation. Such a characteristic diagram may also be dependent on the usage quantity as an additional variable, to account, for example, for a degradation that accelerates if the component is operated at specific harsh conditions for an extended amount of time. The results of the calibration between the state variables and the lifetime decrement value, the degradation rate and/or the derivative of the degradation may be brought into the form of a characteristic diagram very easily.

Preferably, the evaluation unit may be configured to increase the lifetime decrement value, the degradation rate, and/or the derivative of the degradation, of the air dryer if the inlet air temperature of the air dryer and/or the saturation of the air dryer exceeds a predetermined threshold value. The moisture absorbent medium in the air dryer degrades much faster if the temperature is higher. If the saturation of the moisture absorbent medium exceeds a specific threshold value, the medium will remember this akin to a tire that remembers every hit against a curb: There is a small irreversible degradation.

Preferably, the evaluation unit may be configured to increase the lifetime decrement value, the degradation rate, and/or the derivative of the degradation, of the compressor with an increasing system pressure of the compressed air system and/or with the vehicle engine speed and/or with the temperature of the compressor. To increase the amount of air in the system, the compressor must work against the system pressure. The higher the system pressure, the harder the work the compressor has to do for a given amount of compressed air, and the more expensive the degradation price tag. The speed of the compressor is usually determined by the speed of the vehicle engine that drives the compressor. The higher this speed, the higher the wear that the moving parts inside the compressor are subjected to. This wear also depends significantly on the temperature of the compressor. In determining the lifetime decrement value, the degradation rate and/or the derivative of the degradation, it is not compulsory that the compressor be regarded as one single unit. Different parts of the compressor may have their own separate degradation accounts. For example, the crankcase of the compressor may be more resilient to degradation than the valves of the compressor, and the valves may in turn be more resilient against degradation than the pistons and piston rings.

Preferably, the evaluation unit is configured to increase the lifetime decrement value, the degradation rate, and/or the derivative of the degradation, of a valve when the ambient temperature drops below a predetermined threshold value. Especially the valves that are located upstream of the air dryer may be subjected to moisture. Valves in the high-pressure supply line between the compressor and the air dryer may be even subjected to liquid water that has condensed from the moisture by the pressure of the compressor. When the ambient temperature drops below freezing, this water may freeze. The valves contain rubber elements that yield as the freezing water expands. This keeps the valve from being blown apart. However, each time the rubber element yields under the high force of the building ice, there is a little irreversible degradation. Very low temperatures also make the rubber more brittle and cause an early aging.

In a specially advantages embodiment of the invention, the device is adapted to predict the remaining life time of multiple components in the system and to compare the cost of servicing multiple components in one session with the cost of servicing them separately. Multiple components will rarely be due for maintenance at exactly the same time. The service life of each component is used up most efficiently by servicing each component exactly at the time when it is due. However, if another component has only a few more days or weeks of service life in it, this may not be economical: To reach components for servicing, it is often necessary to partially dismantle the compressed air system or other parts of the vehicle that are in the way. This is a laborious task that may cost more in working hours than the replacement part itself. If one component is due for servicing and early servicing of another component in the same session forfeits a few Euros' worth of service life of that second component, this is a better buy compared with another lost working day for the vehicle a few weeks later when the second component is due for servicing. To this end, the evaluation unit may contain information on the cost of replacement parts, the locations of different components inside the vehicle and the labor cost for accessing each of these locations for servicing. The device may also be interfaced with systems that monitor the remaining service life of other vehicle components. Maintenance of the compressed air supply system may then be synchronized to other maintenance, which is even more cost effective for the owner of the vehicle.

The invention not only makes the maintenance of the compressed air supply system more cost effective. It also increases the reliability of the commercial vehicle as a whole. If the compressed air system fails, the vehicle is grounded on the spot. Such a breakdown entails a high cost for roadside assistance, recovery of the vehicle or even the loss of a perishable cargo.

The invention also provides a method for calibrating a device according to the invention. The component is operated according to at least one predetermined value of the usage quantity and at least one predetermined value of the at least one state variable. The amount of an actual degenerative change of the component brought about during this operation is determined. From this amount of the actual degenerative change, in connection with the values of the usage quantity and state variables, a lifetime decrement value, and/or a value of the degeneration rate and/or the derivative of the degradation, for use by the evaluation unit is determined. This measurement sets the exact price tag in terms of service life of the component for future use of the component during vehicle operation under the tested conditions. Preferably, this measurement is performed at least twice for different values of the usage quantity and/or the state variable. The more measurements are performed, the more accurately will the lifetime decrement values, the degradation rates and/or the derivatives of the degradation determined by the evaluation unit during the normal operation of the vehicle reflect the actual degradation of the component that is currently being effected.

The calibration according to the method may be performed outside of the normal vehicle operation. Therefore, the degenerative change that is monitored can be chosen to be a change that is not accessible for measurement while the vehicle is in operation. For example, the degenerative change may be chosen to be at least one of a mechanical wear or distortion of a part of the component, the weight of the component, the amount of leakage the component exhibits when subjected to a pressure differential, and/or the amount of compressed air delivered during operation of the component and/or of the system according to a predetermined set of operating parameters. To measure a mechanical wear or distortion of a part of the component, it is usually necessary to remove the component from the vehicle. It may even be necessary to disassemble the component to access the part in question. Examples include the rubber parts inside valves that take the strain from freezing water, and silencer structures. The degradation of an air dryer is very closely related to the amount of moisture or dirt that has been permanently trapped inside the moisture absorbent medium and cannot be expelled any longer during regeneration of the air dryer. This residual contamination of the air dryer can be easily measured by removing the air dryer from the vehicle and weighing it. An air dryer that is due for servicing weighs about 10% more than a fresh air dryer. When a valve is subjected to wear, its leakage rate will increase, which can be determined by removing the valve and testing it with a fixed pressure differential. When moving parts of the compressor are subjected to wear, the leakage rate of the compressor will increase, so that it will deliver less compressed air compared with a fresh compressor under identical operating conditions. This can be measured by disconnecting the compressor from the compressed air supply system and connecting it to a test setup. All of these measurements cannot be performed while the vehicle is in operation. The invention provides a way to transfer the knowledge from these offline measurements to the later normal operation of the vehicle.

BRIEF DESCRIPTION OF THE DRAWINGS

In the following, advantageous embodiments of the invention are explained using drawings without limiting the scope of the invention. It is shown.

DETAILED DESCRIPTION OF THE DRAWINGS

Figure 1:
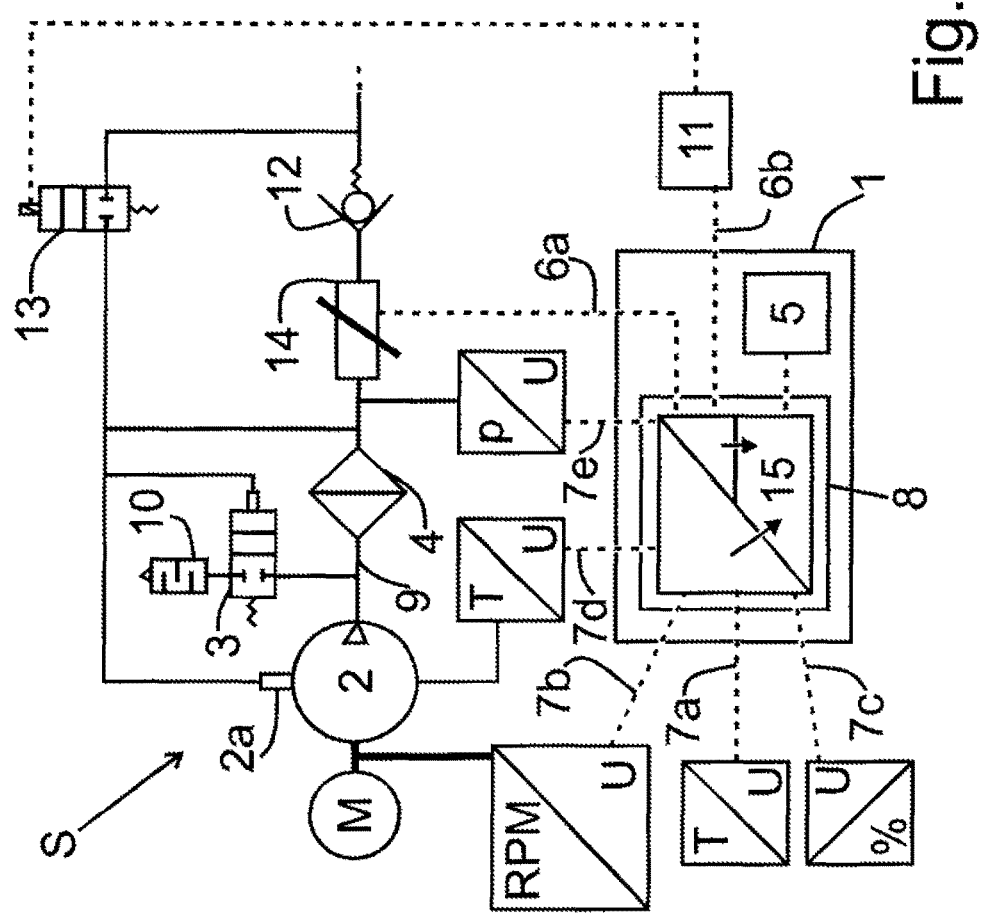
FIG. 1 is an embodiment of a compressed air supply system for a commercial vehicle with a device according to the invention.

FIG. 1 shows an embodiment of a compressed air supply system S for a commercial vehicle that is equipped with a device 1 according to the invention. The system S has a compressor 2 that is driven by the vehicle engine M. It feeds compressed air via a high-pressure supply line 9 into an air dryer 4. The dried air is passed through a mass flow meter 14 and a check valve 12 to the air consuming units, which are not shown in FIG. 1. During operation of the system, moisture will accumulate in the air dryer 4. Periodic regeneration of the air dryer 4 is therefore necessary. To this end, a solenoid valve 13 provides a path around the check valve 12. If this valve is energized by the electronic control unit 11, air will flow in the reverse direction through the mass flow meter 14 and the air dryer 4. At the same time, a pneumatic control signal will be sent to the control port 2a of the compressor 2 to unload it. The pneumatically actuated valve 3 will at the same time be actuated, so that air from the high-pressure supply line 9 can be vented through the silencer 10 to atmosphere. Thus, the moisture that has been extracted from the air dryer 4 by the air passing through it in the reverse direction will be permanently extracted from the compressed air system S.

The air flow measured by the mass flow meter 14 and the control signals delivered by the electronic control unit 11 to the solenoid unit 13 are delivered to the device 1 as usage quantities 6a and 6b. At the same time, multiple state variables are measured and supplied to the device 1. The ambient temperature is measured as state variable 7a. The rotational speed (RPM) of the shaft between the motor M and the compressor 2 is measured as state variable 7b. The ambient humidity is measured as state variable 7c. The temperature of the compressor is measured as state variable 7d. The system pressure is measured by a pressure sensor as state variable 7e. By means of its calibration through offline tests, the evaluation unit 8 combines the usage quantities 6a and 6b with the values of the state variables 7a-7e to lifetime decrement values 15 for the compressor 2, the valve 3 and the air dryer 4. These lifetime decrement values 15 are the price that has to be paid for use of these components 2, 3, 4 according to the usage quantities 6a and 6b in terms of degradation. To obtain the lifetime decrement values 15, degradation rates of the components 2, 3, 4 per unit of the usage quantities are determined. From the degradation rate and the usage quantities 6a and 6b, the lifetime decrement values 15 that are an estimate for the actual degradation of the components 2, 3 and 4 caused by the current use are obtained. Based on the lifetime decrement values 15, the degradation values in the memory unit 5 are updated. These values are a measure for the remaining service life of the components 2, 3 and 4. For each of these components, a separate degradation value is maintained inside the memory unit 5.

Figure 2:
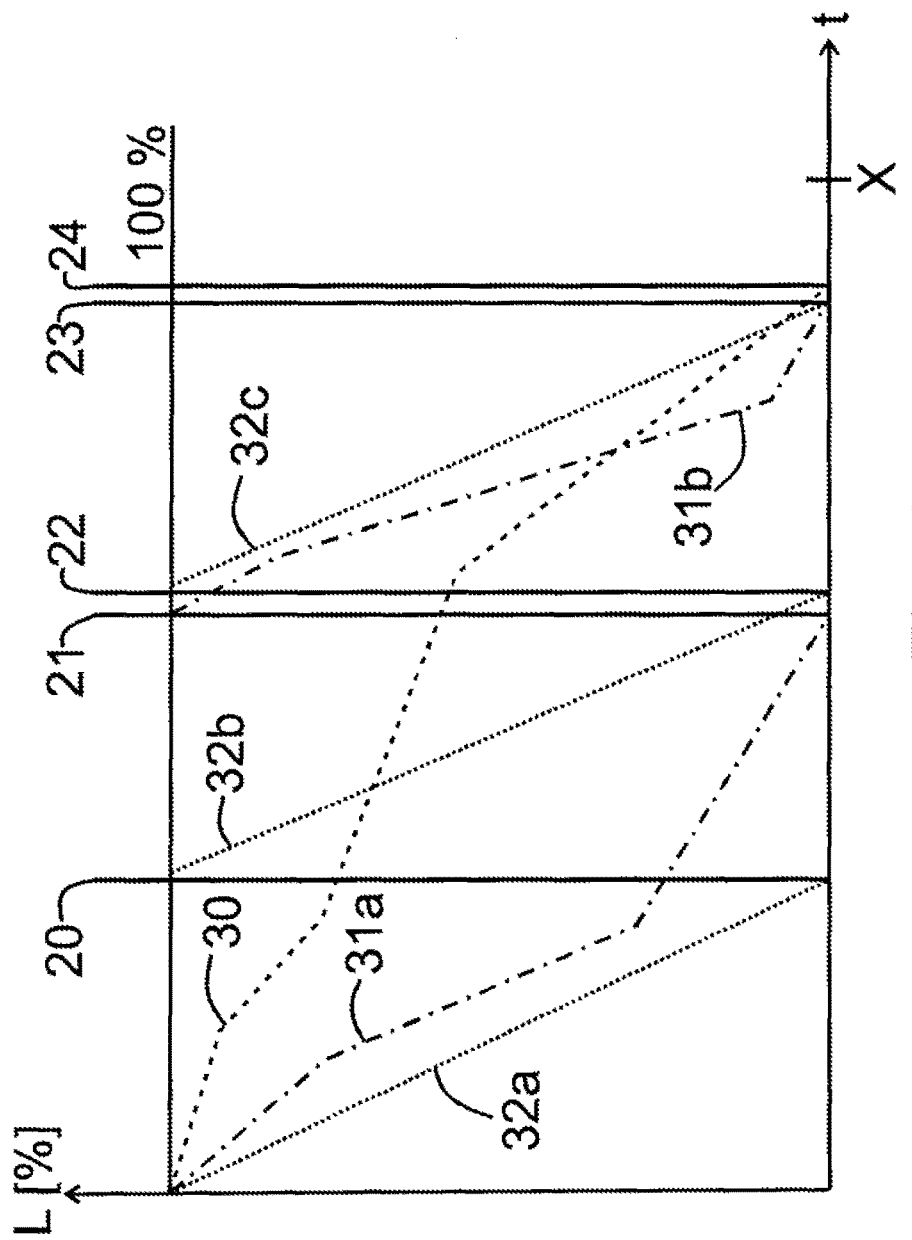
FIG. 2 is a graph of different maintenance intervals for different components.

FIG. 2 illustrates the development of the degradation over time for the compressor 2, the main valve 3 and the air dryer 4. It also illustrates a way to save maintenance costs by servicing multiple components in one session.

The degradation is converted into the remaining life time L and plotted over the time t. The remaining lifetime starts out at the 100% for a fresh component and then slowly decreases towards zero. When a component is serviced, the fresh component starts out at 100% again. Curve 30 shows a remaining lifetime L of the compressor 2. Time intervals where the slope of the curve 30 is steeper correspond to time intervals where the operating conditions for the compressor 2 have been harsher. It can be inferred from FIG. 2 that if the operating conditions for the compressor 2 had been at least a little bit less harsh in the final part of curve 30, the service life of the compressor 2 would have reached the point X on the time axis which marks the economic lifetime of the truck as a whole. The harsh operating conditions make a premature maintenance at the point in time 24 compulsory.

Curve 31a represents the remaining lifetime of the main valve 3. It decreases towards zero much faster than the curve 30 for the compressor. At the point in time 21, the main valve 3 is used up and must be replaced. The fresh main valve 3 starts out at 100% again. Its remaining lifetime is shown in curve 31b. The curve 31b has a much steeper slope than the curve 31a. This indicates that the operating conditions for the main valve 3 have become a lot harsher after the replacement of the valve at point in time 21. At about the same time, the operating conditions have become worse for the compressor 2 as well, indicated by the steeper slope in the final part of curve 30.

The curve 32a illustrates the degeneration of the air dryer 4. This degradation is pretty much linear until point in time 20, where the air dryer has to be replaced. The fresh air dryer starts out at 100% again; its degradation is shown in curve 32b. The degradation is linear again, and it has almost the same slope as curve 32a. At point in time 22, the second air dryer 4 is exhausted as well, and it has to be replaced again. The degradation of the third air dryer 4 is shown in curve 32c. Almost no change in slope can be observed compared with curve 32b. The air dryer 4 is the component that has to be serviced most frequently, but its degradation appears to be largely independent of vehicle operating conditions.

At the point in time 20, only the air dryer 4 is due for maintenance. However, the points in time 21 and 22 where the main valve and the air dryer are due for maintenance are very close together. If the air dryer is replaced at point in time 21 in one session with the main valve 3, very little service life remaining in the air dryer 4 at this point in time is lost. This is outweighed by the benefit of having to pull in for service and dismantle the compressed air system only once.

Likewise, the point in time 23 where the main valve 3 and the air dryer 4 are due for maintenance is very close to the point in time 24 where the compressor is due for maintenance. Since the compressor 2 has very little service life left in it at point in time 23, it pays to service the compressor 2 together with the main valve 3 and the air dryer 4 in one session only. This saves more in labor costs than delaying the maintenance of the compressor by just a few more days or weeks until point in time 24 would yield.

LIST OF REFERENCE NUMERALS 1 lifetime prediction device
2 compressor
3 main valve in high-pressure supply line 9
4 air dryer
5 memory unit for degradation of components 2, 3, 4
6a, 6b usage quantities
7a, 7b, 7c, 7d, 7e state variables
8 evaluation unit
9 passage (high-pressure supply line) between compressor 2 and air dryer 4
10 silencer
11 electronic control unit
12 check valve
13 solenoid valve
14 mass flow meter
15 lifetime decrement value
20, 21, 22, 23, 24 points in time where a component 2, 3, 4 must be serviced
30 remaining lifetime L of compressor 2
31a remaining lifetime L of original main valve 3
31b remaining lifetime L of replacement main valve 3
32a remaining lifetime L of original air dryer 4
32b remaining lifetime L of first replacement air dryer 4
32c remaining lifetime L of second replacement air dryer 4
L remaining lifetime of a component 2, 3, 4
M vehicle engine
S compressed air supply system
t time

What is claimed is:

1. A device for predicting a remaining lifetime of a component in a compressed air supply system for a vehicle, comprising:
   a memory unit for a value related to degradation of the component;
   at least one first input for a usage quantity which is a measure for an operating time and/or a number of operating cycles of the component, and/or for an amount of compressed air delivered by the compressed air supply system;
   at least one second input for at least one state variable which is a measure for at least one vehicle and/or air supply operation condition or environmental condition; and
   an evaluation unit that is configured to combine the usage quantity and the state variable into a lifetime decrement value that is a measure for the degradation of the component caused by the usage according to the usage quantity, and update the value in the memory unit according to this lifetime decrement value.

2. The device according to claim 1, wherein
   the evaluation unit is further configured to determine the lifetime decrement value by estimating a derivative of the degradation of the component with respect to the usage quantity from the state variable and integrating this derivative over the usage quantity.

3. The device according to claim 2, wherein
   the evaluation unit is further configured to determine a degradation rate of the component per unit of the usage quantity from the state variable and to determine the lifetime decrement value from this degradation rate and the usage quantity.

4. The device according to claim 1, wherein
   the evaluation unit is further configured to determine a degradation rate of the component per unit of the usage quantity from the state variable and to determine the lifetime decrement value from this degradation rate and the usage quantity.

5. The device according to claim 1, wherein the component is at least one of: a compressor, a part of a compressor, an air dryer, an oil separator, a particle filter, a moisture container, a valve configured to vent a passage between said compressor and said air dryer, and a silencer disposed in said vent of the passage.

6. The device according to claim 5, wherein the state variable is at least one of: ambient temperature, ambient moisture, moisture of the delivered air, running speed of the compressor, temperature of the compressor, degree of saturation of the air dryer, an amount or concentration of moisture in a moisture container of the air dryer, duty cycle of the compressor, and a system pressure of the compressed air supply system.

7. The device according to claim 5, wherein the evaluation unit is configured to increase the lifetime decrement value, the degradation rate, and/or the derivative of the degradation, of the air dryer if the inlet air temperature of the air dryer and/or the saturation of the air dryer exceeds a predetermined threshold value.

8. The device according to claim 5, wherein the evaluation unit is configured to increase the lifetime decrement value, the degradation rate, and/or the derivative of the degradation, of the compressor with an increasing system pressure of the compressed air supply system and/or with the vehicle engine speed and/or with the temperature of the compressor.

9. The device according to claim 5, wherein the evaluation unit is configured to increase the lifetime decrement value, the degradation rate, and/or the derivative of the degradation, of the valve when the ambient temperature drops below a predetermined threshold value.

10. The device according to claim 1, wherein the state variable is at least one of: ambient temperature, ambient moisture, moisture of the delivered air, running speed of a compressor, temperature of the compressor, degree of saturation of an air dryer, an amount or concentration of moisture in a moisture container of the air dryer, duty cycle of the compressor, and a system pressure of the compressed air supply system.

11. The device according to claim 1, wherein the evaluation unit contains a lookup table which relates parametrized ranges of one or more state variables to the lifetime decrement value, a degradation rate, and/or the derivative of the degradation, of the component.

12. The device according to claim 1, wherein the device is adapted to predict the remaining lifetime of multiple components in the system and to compare a cost of servicing multiple components in one session with a cost of servicing them separately.

13. A method for calibrating a device for predicting a remaining lifetime of a component in a compressed air supply system for a vehicle, wherein the device comprises: a memory unit for a value related to degradation of the component; at least one first input for a usage quantity which is a measure for an operating time and/or a number of operating cycles of the component, and/or for an amount of compressed air delivered by the compressed air supply system; at least one second input for at least one state variable which is a measure for at least one vehicle and/or air supply operation condition or environmental condition; and an evaluation unit that is configured to combine the usage quantity and the state variable into a lifetime decrement value that is a measure for the degradation of the component caused by the usage according to the usage quantity, and update the value in the memory unit according to this lifetime decrement value, the method comprising the steps of:
operating the component according to at least one predetermined value of the usage quantity and at least one predetermined value of the at least one state variable;
determining the amount of an actual degenerative change of the component brought about by said operation; and
determining a lifetime decrement value, and/or a value of the degeneration rate and/or the derivative of the degradation for use by the evaluation unit from said amount of the actual degenerative change and said values of the usage quantities and state variables.

14. The method according to claim 13, wherein the degenerative change is chosen to be a change that is not accessible for measurement while the vehicle is in operation.

15. The method according to claim 14, wherein the component is operated and the degenerative change is determined at least twice for different values of the usage quantity and/or the state variable.

16. The method according to claim 13, wherein the component is operated and the degenerative change is determined at least twice for different values of the usage quantity and/or the state variable.

17. The method according to claim 13, wherein the degenerative change is chosen to be at least one of a mechanical wear or distortion of a part of the component, a weight of the component, an amount of leakage the component exhibits when subjected to a pressure differential, and/or an amount of compressed air delivered during operation of the component and/or the system according to a predetermined set of operating parameters.

* * * * *